United States Patent
Szuromi et al.

(10) Patent No.: US 12,552,879 B2
(45) Date of Patent: Feb. 17, 2026

(54) BIDENTATE BIARYLPHENOXY GROUP IV TRANSITION METAL CATALYSTS FOR OLEFIN POLYMERIZATION WITH CHAIN TRANSFER AGENTS

(71) Applicant: Dow Global Technologies LLC, Midland, MI (US)

(72) Inventors: Endre Szuromi, Richwood, TX (US); Andrew M. Camelio, Auburn, MI (US); David D. Devore, Midland, MI (US); Kara A. Milbrandt, Freeland, MI (US); Matthew D. Christianson, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 930 days.

(21) Appl. No.: 17/764,369

(22) PCT Filed: Sep. 28, 2020

(86) PCT No.: PCT/US2020/053074
§ 371 (c)(1),
(2) Date: Mar. 28, 2022

(87) PCT Pub. No.: WO2021/067184
PCT Pub. Date: Apr. 8, 2021

(65) Prior Publication Data
US 2022/0403060 A1    Dec. 22, 2022

Related U.S. Application Data

(60) Provisional application No. 62/907,954, filed on Sep. 30, 2019.

(51) Int. Cl.
C08F 4/76 (2006.01)
C08F 4/649 (2006.01)
C08F 210/16 (2006.01)

(52) U.S. Cl.
CPC .......... C08F 4/6498 (2013.01); C08F 210/16 (2013.01); *C08F 2410/04* (2013.01)

(58) Field of Classification Search
None
See application file for complete search history.

(56) References Cited

U.S. PATENT DOCUMENTS

| | | | | |
|---|---|---|---|---|
| 11,066,488 B2 * | 7/2021 | Szuromi | ............ | C08F 4/65912 |
| 11,104,751 B2 * | 8/2021 | Camelio | ................ | C07F 7/28 |
| 2007/0167315 A1 | 7/2007 | Arriola et al. | | |
| 2013/0144018 A1 * | 6/2013 | Klosin | .................. | C07F 7/00 |
| | | | | 548/440 |

FOREIGN PATENT DOCUMENTS

| | | | | |
|---|---|---|---|---|
| CN | 105294905 A | 2/2016 | | |
| JP | 2013534934 A | 9/2013 | | |
| WO | 2012027448 A1 | 3/2012 | | |
| WO | 2013013111 A1 | 1/2013 | | |
| WO | 2013036546 A2 | 3/2013 | | |
| WO | 2013052585 A2 | 4/2013 | | |
| WO | 2018236996 A1 | 12/2018 | | |
| WO | WO-2018236738 A1 * | 12/2018 | ............ | C08F 110/02 |
| WO | WO-2018236863 A1 * | 12/2018 | ................ | C07F 7/28 |

OTHER PUBLICATIONS

Chinese Office Action dated Oct. 11, 2023, pertaining to CN Patent Application No. 202080062844.2, 24 pgs.
Thai Official Action dated Mar. 25, 2024, pertaining to TH Patent Application No. 2201001454, 11 pgs.
Communication pursuant to Article 94(3) dated Oct. 18, 2023, pertaining to EP Patent Application No. 20790147.1, 8 pgs.
International Search Report and Written Opinion dated Dec. 11, 2020, pertaining to Int'l Patent Application No. PCT/US2020/053074.
Japanese Office Action dated Oct. 29, 2024, pertaining to JP Patent Application No. 2022-515731, 6 pgs.
Chinese Office Action dated Oct. 24, 2024, pertaining to CN Patent Application No. 2020800628442, 20 pgs.
Chinese Office Action dated May 6, 2024, pertaining to CN Patent Application No. 202080062844.2, 20 pgs.
Korean Office Action dated Jul. 10, 2025, pertaining to KR Patent Application No. 10-2022-7013735, 14 pgs.
Communication pursuant to Article 94(3) EPC dated Mar. 28, 2025, pertaining to EP Patent Application No. 20790147.1, 5 pgs.
Brazilian Office Action dated Dec. 2, 2025, pertaining to BR Patent Application No. BR112022004445.3, 4 pgs.

* cited by examiner

*Primary Examiner* — Richard A. Huhn
(74) *Attorney, Agent, or Firm* — Dinsmore & Shohl LLP

(57) ABSTRACT

Processes of polymerizing olefins include contacting ethylene, a $(C_3-C_{40})$alpha-olefin comonomer, and a solvent in the presence of a chain transfer agent and a catalyst system, the catalyst system comprising a metal-ligand complex according to formula (I).

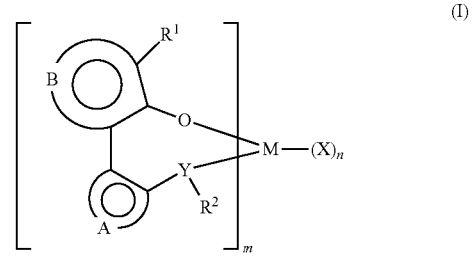

15 Claims, No Drawings

BIDENTATE BIARYLPHENOXY GROUP IV TRANSITION METAL CATALYSTS FOR OLEFIN POLYMERIZATION WITH CHAIN TRANSFER AGENTS

CROSS-REFERENCE TO RELATED APPLICATIONS

This application is a National Stage Entry under 35 U.S.C. § 371 of International Patent Application No. PCT/US2020/053074, filed Sep. 28, 2020, which claims priority to U.S. Provisional Patent Application No. 62/907,954, filed on Sep. 30, 2019, the entire disclosures of both of which are hereby incorporated by reference.

TECHNICAL FIELD

Embodiments of the present disclosure generally relate to olefin polymerization catalyst systems and processes, and, more specifically, to the olefin polymerization catalyst systems including thiazole, imidazole, or biphenoxy Group IV transition metal catalysts and to olefin polymerization processes incorporating the catalyst systems.

BACKGROUND

Olefin-based polymers such as polyethylene, ethylene-based polymers, polypropylene, and propylene-based polymers are produced via various catalyst systems. Selection of such catalyst systems used in the polymerization process of the olefin-based polymers is an important factor contributing to the characteristics and properties of such olefin based polymers.

Ethylene-based polymers and propylene-based are manufactured for a wide variety of articles. The polyethylene and polypropylene polymerization process can be varied in a number of respects to produce a wide variety of resultant polyethylene resins having different physical properties that render the various resins suitable for use in different applications. The ethylene monomers and, optionally, one or more co-monomers are present in liquid diluents (such as solvents), such as an alkane or isoalkane, for example isobutene. Hydrogen may also be added to the reactor. The catalyst systems for producing ethylene-based may typically comprise a chromium-based catalyst system, a Ziegler-Natta catalyst system, and/or a molecular (either metallocene or non-metallocene (molecular)) catalyst system. The reactants in the diluent and the catalyst system are circulated at an elevated polymerization temperature around the reactor, thereby producing ethylene-based homopolymer or copolymer. Either periodically or continuously, part of the reaction mixture, including the polyethylene product dissolved in the diluent, together with unreacted ethylene and one or more optional co-monomers, is removed from the reactor. The reaction mixture, when removed from the reactor, may be processed to remove the polyethylene product from the diluent and the unreacted reactants, with the diluent and unreacted reactants typically being recycled back into the reactor. Alternatively, the reaction mixture may be sent to a second reactor, serially connected to the first reactor, where a second polyethylene fraction may be produced. Despite the research efforts in developing catalyst systems suitable for olefin polymerization, such as polyethylene or polypropylene polymerization, there is still a need to increase the efficiencies of catalyst systems that are capable of producing polymer with high molecular weights and a narrow molecular weight distribution.

SUMMARY

Despite the currently available olefin polymerization catalyst systems, there is need for high-temperature polymerization catalysts with improved molecular properties that facilitate the production of high molecular weight (Mw) polymers having narrow polydispersities (PDIs) and/or high comonomer incorporation (for example, greater than 20% comonomer). There are further needs for high-temperature polymerization catalysts that have the ability to participate in chain transfer to make olefin block copolymers. Olefin block copolymers (OBCs) exhibit superior qualities for performance differentiation that are not accessible through polymer blending.

Embodiments of this disclosure include processes for polymerizing olefins. The processes include contacting ethylene, a ($C_3$-$C_{40}$)alpha-olefin comonomer, and a solvent in the presence of a chain transfer agent and a catalyst system, the catalyst system comprising a metal-ligand complex according to formula (I):

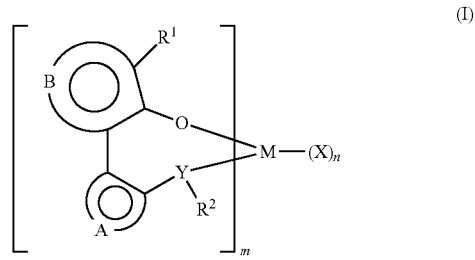

(I)

In formula (I), M is a metal chosen from titanium, zirconium, or hafnium, the metal having a formal oxidation state of +2, +3, or +4. Each X is a monodentate or bidentate ligand independently chosen from unsaturated ($C_2$-$C_{50}$)hydrocarbon, unsaturated ($C_2$-$C_{50}$)heterohydrocarbon, ($C_1$-$C_{50}$)hydrocarbyl, ($C_6$-$C_{50}$)aryl, ($C_6$-$C_{50}$)heteroaryl, cyclopentadienyl, substituted cyclopentadienyl, ($C_4$-$C_{12}$)diene, halogen, —N($R^N$)$_2$, and —NCOR$^C$. Subscript n is 1, 2, or 3. Subscript m is 1 or 2, and the metal-ligand complex has 6 or fewer metal-ligand bonds. Each Y is independently selected from oxygen or sulfur.

In formula (I), each $R^1$ is independently selected from the group consisting of ($C_1$-$C_{50}$)hydrocarbyl, ($C_1$-$C_{50}$)heterohydrocarbyl, ($C_6$-$C_{50}$)aryl, ($C_4$-$C_{50}$)heteroaryl, —Si($R^C$)$_3$, —Ge($R^C$)$_3$, —P($R^P$)$_2$, —N($R^N$)$_2$, —OR$^C$, —SR$^C$, —NO$_2$, —CN, —CF$_3$, $R^C$S(O)—, —P(O)($R^P$)$_2$, $R^C$S(O)$_2$—, ($R^C$)$_2$C=N—, $R^C$C(O)O—, $R^C$OC(O)—, $R^C$C(O)N(R)—, ($R^C$)$_2$NC(O)—, halogen, and —H. Each $R^2$ is independently chosen from ($C_1$-$C_{50}$)hydrocarbyl, ($C_1$-$C_{50}$)heterohydrocarbyl, ($C_6$-$C_{50}$)aryl, ($C_4$-$C_{50}$)heteroaryl, —Si($R^C$)$_3$, and —Ge($R^C$)$_3$.

In formula (I), each A is independently chosen from -$z_3$-$z_4$-$z_5$- or —C($R^3$)C($R^4$)C($R^5$)C($R^6$)—. Each of $z_3$, $z_4$, and $z_5$ of each A is selected from the group consisting of sulfur, oxygen, —N($R^A$)—, and —C($R^A$)—, provided that exactly one of $z_3$, $z_4$, or $z_5$ is —C($R^A$)— or that exactly two of $z_3$, $z_4$, or $z_5$ are —C($R^A$)—. Each $R^A$ of —C($R^A$)— is independently chosen from ($C_1$-$C_{50}$)hydrocarbyl, ($C_1$-$C_{50}$)heterohydrocarbyl, ($C_6$-$C_{50}$)aryl, ($C_4$-$C_{50}$)heteroaryl, —Si($R^C$)$_3$, —Ge($R^C$)$_3$, —P($R^P$)$_2$, —N($R^N$)$_2$, —OR$^C$, —SR$^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N(R)—, ($R^C$)$_2$NC(O)—, halogen, or —H, in which any two $R^A$ groups bonded to neighboring atoms are optionally linked. Each $R^3$, $R^4$, $R^5$, and $R^6$ of each A is independently chosen from $(C_1-C_{50})$hydrocarbyl, $(C_1-C_{50})$heterohydrocarbyl, halogen, or —H.

In formula (I), each B is independently chosen from $-z_6-z_7-$ or $-C(R^7)C(R^8)C(R^9)-$. Each of $z_6$ and $z_7$ of B is selected from the group consisting of sulfur, oxygen, $-N(R^B)-$, and $-C(R^B)-$, provided that not more than one of $z_6$ or $z_7$ is $-C(R^B)-$. Each $R^B$ of $-C(R^B)-$ is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, halogen, or —H, in which any two $R^B$ groups bonded to neighboring atoms are optionally linked; Each $R^7$, $R^8$, and $R^9$ of B is independently chosen from $(C_1-C_{50})$hydrocarbyl, $(C_1-C_{50})$heterohydrocarbyl, $(C_6-C_{50})$aryl, $(C_4-C_{50})$heteroaryl, $-Si(R^C)_3$, $-Ge(R^C)_3$, $-P(R^P)_2$, $-N(R^N)_2$, $-OR^C$, $-SR^C$, $-NO_2$, $-CN$, $-CF_3$, $R^CS(O)-$, $R^CS(O)_2-$, $(R^C)_2C=N-$, $R^CC(O)O-$, $R^COC(O)-$, $R^CC(O)N(R)-$, $(R^C)_2NC(O)-$, halogen, or —H. In formula (I), each $R^C$, $R^N$, and $R^P$ in formula (I) is independently a $(C_1-C_{50})$hydrocarbyl.

DETAILED DESCRIPTION

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

$R^C$, $R^Z$, $R^1$, $R^2$, $R^3$, $R^4$, $z_1$, $z_2$, $z_3$, X, Y, Q, and W: as defined above; Me: methyl; Et: ethyl; Ph: phenyl; Bn: benzyl; i-Pr: iso-propyl; t-Bu: tert-butyl; t-Oct: tert-octyl (2,4,4-trimethylpentan-2-yl); THF: tetrahydrofuran; $Et_2O$: diethyl ether; $CH_2Cl_2$: dichloromethane; EtOAc: ethyl acetate; $C_6D_6$: deuterated benzene or benzene-d6: $CDCl_3$: deuterated chloroform; $Na_2SO_4$: sodium sulfate; $MgSO_4$: magnesium sulfate; HCl: hydrogen chloride; n-BuLi: butyllithium; t-BuLi: tert-butyllithium; $K_2CO_3$: potassium carbonate; $N_2$: nitrogen gas; PhMe: toluene; PPR: parallel pressure reactor; MAO: methylaluminoxane; MMAO: modified methylaluminoxane; GC: gas chromatography; LC: liquid chromatography; NMR: nuclear magnetic resonance; MS: mass spectrometry; mmol: millimoles; mL: milliliters; M: molar; min or mins: minutes; h or hrs: hours; d: days; $R_f$: retention fraction; TLC; thin-layer chromatography; rpm: revolutions per minute.

The term "independently selected" followed by multiple options is used herein to indicate that individual groups appearing before the term, such as $R^1$, $R^2$, $R^3$, $R^4$, and $R^C$, can be identical or different, without dependency on the identity of any other group also appearing before the term.

The term "procatalyst" refers to a compound that has catalytic activity after activation, for example upon removal of the Lewis base coordinated to the Ni or Pd metal center.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form.

In some embodiments and general structures, certain chemical groups may be substituted by one or more substituents such as $R^S$ wherein $R^S$ generically represents any substituent defined in this application. An $R^S$ substituted version of a chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl ($-C_6H_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total numbers of carbon atoms of the chemical group are determined by adding to both x and y, respectively, the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g., $R^S$). The prefix "per" has its usual meaning of "thoroughly" or "utterly", for example, the term "persubstitution" or "persubstituted", means that every hydrogen atom (H) bonded to a carbon atom or heteroatom of a corresponding unsubstituted compound or functional group is replaced by a substituent (e.g., $R^S$), as in "perfluorinated alkyl" means every hydrogen in an alkyl group is replaced by a fluorine atom. The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl may be an unsubstituted or substituted $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl ($-CH_2-C_6H_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 2,2-dimethylpropyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_{45}]$alkyl. The term "$[C_{45}]$alkyl" means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, 2,2-dimethylpropyl; or 1,1-dimethylethyl.

The term "$(C_6-C_{50})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphthyl; and phenanthrenyl. Examples of substituted $(C_6-C_{40})$aryl include: substituted $(C_1-C_{20})$aryl; substituted $(C_6-C_{18})$aryl; 2,4-bis($[C_{20}$]alkyl)-phenyl; 3,5-bis($[C_{20}$]alkyl)-phenyl; polyfluorophenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include unsubstituted or substituted $(C_6-C_{50})$arylene, $(C_3-C_{50})$cycloalkylene, and $(C_1-C_{50})$alkylene (e.g., $(C_1-C_{20})$alkylene). The diradicals may be on the same carbon atom (e.g., —CH$_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e., —CH$_2$CH$_2$—), propan-1,3-diyl (i.e., —CH$_2$CH$_2$CH$_2$—), 2-methylpropan-1,3-diyl (i.e., —CH$_2$CH(CH$_3$)CH$_2$—). Some examples of $(C_6-C_{50})$arylene α,ω-diradicals include phenyl-1,4-diyl, napthalen-2,6-diyl, or napthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —CH$_2$CH$_2$—, —(CH$_2$)$_3$—, —(CH$_2$)$_4$—, —(CH$_2$)$_5$—, —(CH$_2$)$_6$—, —(CH$_2$)$_7$—, —(CH$_2$)$_8$—, —CH$_2$C*HCH$_3$, and —(CH$_2$)$_4$C*(H)(CH$_3$)—, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —CF$_2$—, —C(O)—, and —(CH$_2$)$_{14}$C(CH$_3$)$_2$(CH$_2$)$_5$— (i.e., a 6,6-dimethyl substituted 1,20-eicosylene). Since as mentioned previously two $R^S$ may be taken together to form a $(C_1-C_{18})$alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "$(C_3-C_{50})$cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include —O—, —S—, —S(O)—, —S(O)$_2$—, —Si($R^C$)$_2$—, —P($R^P$)—, —P($R^P$)$_2$, —N($R^N$)—, —N($R^N$)$_2$—N═C($R^C$)$_2$, —N═C(N$R_2^N$)($R^C$), —Ge($R^C$)$_2$—, or —Si($R^C$)$_3$, where each $R^C$ and each $R^P$ is unsubstituted $(C_1-C_{18})$hydrocarbyl or —H, and where each $R^N$ is unsubstituted $(C_1-C_{18})$hydrocarbyl. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-S(O)$_2$—, $(C_1-C_{50})$hydrocarbyl-Si($R^C$)$_2$—, $(C_1-C_{50})$hydrocarbyl-N($R^N$)—, $(C_1-C_{50})$hydrocarbyl-P($R^P$)—, $(C_2-C_{50})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene. Additional examples include, but are not limited to —Si($R^C$)$_{3-Q}$(O$R^C$)$_Q$, —OSi($R^C$)$_{3-Q}$(O$R^C$)$_Q$, —Ge($R^C$)$_{3-Q}$(O$R^C$)$_Q$, —P($R^C$)$_{2-W}$(O$R^C$)$_W$, —P(O)($R^C$)$_{2-W}$(O$R^C$)$_W$, —N($R^C$)$_2$, —NH($R^C$)$_2$, —O$R^C$, —S$R^C$, —NO$_2$, —CN, —CF$_3$, —OCF$_3$, —S(O)$R^C$, —S(O)$_2R^C$, —OS(O)$_2R^C$, —N═C($R^C$)$_2$, —N═P($R^C$)$_3$, —OC(O)$R^C$, —C(O)O$R^C$, —N($R^C$)C(O)$R^C$, and —C(O)N($R^C$)$_2$.

The term "$(C_4-C_{50})$heteroaryl" means an unsubstituted or substituted (by one or more $R^S$) mono-, bi-, or tricyclic heteroaromatic hydrocarbon radical of from 4 to 50 total carbon atoms and from 1 to 10 heteroatoms. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x\text{-}C_y)$heteroaryl generally, such as $(C_4\text{-}C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein h is the number of heteroatoms and may be 1, 2, 3, or 4; and each heteroatom may be 0, S, N, or P. Examples of 5-membered ring heteroaromatic hydrocarbon radicals include pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1, 2 or 3 and the heteroatoms may be N or P. Examples of 6-membered ring heteroaromatic hydrocarbon radicals include pyridine-2-yl; pyrimidin-2-yl; pyrazin-2-yl; 1,3,5-triazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazol-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,6,6-ring system is acrydin-9-yl.

The term "$(C_1\text{-}C_{50})$heteroalkyl" means a saturated straight or branched chain radicals containing one to fifty carbon atoms, or fewer carbon atoms and one or more of the heteroatoms. The term "$(C_1\text{-}C_{50})$heteroalkylene" means a saturated straight or branched chain diradical containing from 1 to 50 carbon atoms and one or more than one heteroatom. The heteroatoms of the heteroalkyls or the heteroalkylenes may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or are substituted by one or more $R^S$.

Examples of unsubstituted $(C_2\text{-}C_{40})$heterocycloalkyl include unsubstituted $(C_2\text{-}C_{20})$heterocycloalkyl, unsubstituted $(C_2\text{-}C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means the anionic form of the halogen atom: fluoride (F$^-$), chloride (Cl$^-$), bromide (Br$^-$), or iodide (I$^-$).

The term "saturated" means lacking carbon-carbon double bonds, carbon-carbon triple bonds, and (in heteroatom-containing groups) carbon-nitrogen, carbon-phosphorus, nitrogen-nitrogen, nitrogen-phosphorus, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, or (in heteroatom-containing groups) one or more carbon-nitrogen, carbon-phosphorus, nitrogen-nitrogen, nitrogen-phosphorus, or carbon-silicon double bonds, not including double bonds that may be present in substituents $R^S$, if any, or in (hetero) aromatic rings, if any.

In one or more embodiments, the process includes contacting ethylene, a $(C_3\text{-}C_{40})$alpha-olefin comonomer, and a solvent in the presence of a chain transfer agent and a catalyst system. In various embodiments, the catalyst system includes a metal-ligand complex according to formula (I):

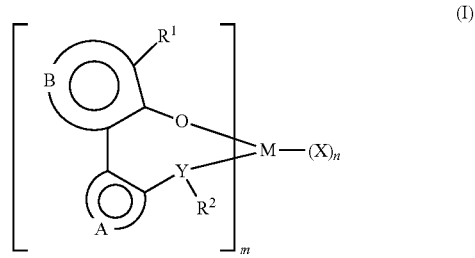

In formula (I), M is a metal chosen from titanium, zirconium, or hafnium, the metal having a formal oxidation state of +2, +3, or +4. Each X is a monodentate or bidentate ligand independently chosen from unsaturated $(C_2\text{-}C_{50})$hydrocarbon, unsaturated $(C_2\text{-}C_{50})$heterohydrocarbon, $(C_1\text{-}C_{50})$hydrocarbyl, $(C_6\text{-}C_{50})$aryl, $(C_6\text{-}C_{50})$heteroaryl, cyclopentadienyl, substituted cyclopentadienyl, $(C_4\text{-}C_{12})$diene, halogen, —$N(R^N)_2$, and —$NCOR^C$. Subscript n is 1, 2, or 3. Subscript m is 1 or 2, and the metal-ligand complex has 6 or fewer metal-ligand bonds. Each Y is independently selected from oxygen or sulfur.

In formula (I), each $R^1$ is independently selected from the group consisting of $(C_1\text{-}C_{50})$hydrocarbyl, $(C_1\text{-}C_{50})$heterohydrocarbyl, $(C_6\text{-}C_{50})$aryl, $(C_4\text{-}C_{50})$heteroaryl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, —$P(O)(R^P)_2$, $R^CS(O)_2$—, $(R^C)_2$C=N—, $R^CC(O)O$—, $R^COC(O)$—, $R^CC(O)N(R)$—, $(R^C)_2NC(O)$—, halogen, and —H. Each $R^2$ is independently chosen from $(C_1\text{-}C_{50})$hydrocarbyl, $(C_1\text{-}C_{50})$heterohydrocarbyl, $(C_6\text{-}C_{50})$aryl, $(C_4\text{-}C_{50})$heteroaryl, —$Si(R^C)_3$, and —$Ge(R^C)_3$.

In formula (I), each A is independently chosen from -$z_3$-$z_4$-$z_5$- or —$C(R^3)C(R^4)C(R^5)C(R^6)$—. Each of $z_3$, $z_4$, and $z_5$ of each A is selected from the group consisting of sulfur, oxygen, —$N(R^A)$—, and —$C(R^A)$—, provided that exactly one of $z_3$, $z_4$, or $z_5$ is —$C(R^A)$— or that exactly two of $z_3$, $z_4$, or $z_5$ are —$C(R^A)$—. Each $R^A$ of —$C(R^A)$— is independently chosen from $(C_1\text{-}C_{50})$hydrocarbyl, $(C_1\text{-}C_{50})$heterohydrocarbyl, $(C_6\text{-}C_{50})$aryl, $(C_4\text{-}C_{50})$heteroaryl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2$C=N—, $R^CC(O)O$—, $R^COC(O)$—, $R^CC(O)N(R)$—, $(R^C)_2NC(O)$—, halogen, or —H, in which any two $R^A$ groups bonded to neighboring atoms are optionally linked. Each $R^3$, $R^4$, $R^5$, and $R^6$ of each A is independently chosen from $(C_1\text{-}C_{50})$hydrocarbyl, $(C_1\text{-}C_{50})$heterohydrocarbyl, halogen, or —H.

In formula (I), each B is independently chosen from -$z_6$-$z_7$- or —$C(R^7)C(R^8)C(R^9)$—. Each of $z_6$ and $z_7$ of B is selected from the group consisting of sulfur, oxygen, —$N(R^B)$—, and —$C(R^B)$—, provided that not more than one of $z_6$ or $z_7$ is —$C(R^B)$—. Each $R^B$ of —$C(R^B)$— is independently chosen from $(C_1\text{-}C_{50})$hydrocarbyl, $(C_1\text{-}C_{50})$ heterohydrocarbyl, $(C_6-C_{50})$aryl, $(C_4-C_{50})$heteroaryl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N(R)—, $(R^C)_2$NC(O)—, halogen, or —H, in which any two R$^B$ groups bonded to neighboring atoms are optionally linked; Each R$^7$, R$^8$, and R$^9$ of B is independently chosen from $(C_1-C_{50})$ hydrocarbyl, $(C_1-C_{50})$heterohydrocarbyl, $(C_6-C_{50})$aryl, $(C_4-C_{50})$heteroaryl, —Si$(R^C)_3$, —Ge$(R^C)_3$, —P$(R^P)_2$, —N$(R^N)_2$, —OR$^C$, —SR$^C$, —NO$_2$, —CN, —CF$_3$, R$^C$S(O)—, R$^C$S(O)$_2$—, $(R^C)_2$C=N—, R$^C$C(O)O—, R$^C$OC(O)—, R$^C$C(O)N(R)—, $(R^C)_2$NC(O)—, halogen, or —H. Each R$^C$, R$^N$, and R$^P$ in formula (I) is independently a $(C_1-C_{50})$hydrocarbyl.

In some embodiments, M is zirconium or hafnium; and each X is independently chosen from $(C_6-C_{20})$aryl, $(C_4-C_{20})$heteroaryl, $(C_4-C_{12})$diene, or a halogen.

In various embodiments, each Y is oxygen. In other embodiments, Y is sulfur.

In one or more embodiments, each B is -z$_6$-z$_7$-, and one of z$_6$ and z$_7$ is sulfur and the other is —C(H)—. Thus, in such embodiments, B is —S—C(H)— or —C(H)—S—. In other embodiments, each A is —C(R$^3$)C(R$^4$)C(R$^5$)C(R$^6$)—, where R$^3$, R$^4$, R$^5$, and R$^6$ are —H; thus, in such embodiments each A is —C(H)C(H)C(H)C(H)—.

In embodiments, each R$^1$ is independently chosen from $(C_1-C_{50})$aryl or $(C_4-C_{50})$heteroaryl. In some embodiments, each R$^1$ is carbazolyl or substituted carbazolyl. The substituted carbazolyl may be a di-$(C_1-C_{12})$alkylcarbozolyl. In various embodiments, R$^1$ is 2,7-di(tert-butyl)carbazolyl or 3,6-di(tert-butyl)carbazolyl. In one or more embodiments, each R$^1$ is phenyl or a substituted phenyl. In various embodiments, each R$^1$ is a substituted phenyl chosen from 2,4,6-trimethylphenyl; 2,4,6-tri(iso-propyl)phenyl; 3,5-di-tert-butylphenyl, or 3,5-diphenylphenyl.

In one or more embodiments, each R$^2$ is $(C_1-C_{10})$alkyl. In various embodiments, each R$^2$ is methyl, ethyl, propyl, 2-propyl, n-butyl, tert-butyl, pentyl, heptyl, octyl, nonyl, decyl, undecyl, dodecyl.

In some embodiments, each B is —C(R$^7$)C(R$^8$)C(R$^9$)—, where R$^7$, R$^8$, and R$^9$ are —H. In other embodiments, each B is —C(R$^7$)C(R$^8$)C(R$^9$)—, where R$^7$ and R$^9$ are —H, and R$^8$ is $(C_1-C_{20})$alkyl.

In various embodiments, R$^1$ is selected from the group consisting of radicals having formula (II), radicals having formula (III), and radicals having formula (IV):

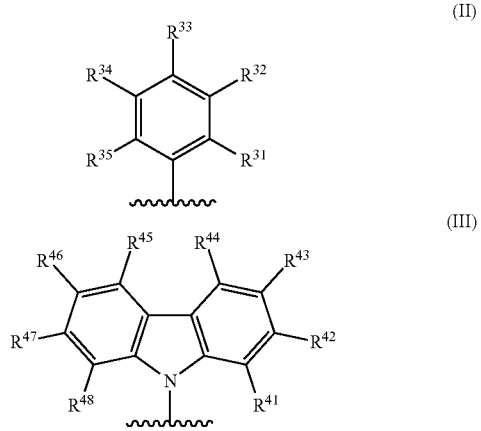

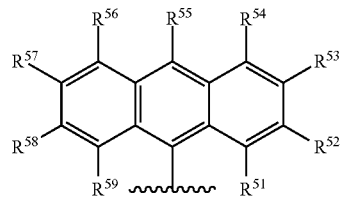

In formulas (II), (III), (IV), R$^{31}$-R$^{35}$, R$^{41}$-R$^{48}$, and R$^{51}$-R$^{59}$ is independently chosen from $(C_1-C_{40})$hydrocarbyl, $(C_1-C_{40})$heterohydrocarbyl, —Si$(R^T)_3$, —Ge$(R^T)_3$, —P$(R^T)_2$, —N$(R^T)_2$, —N=CHR$^T$, —OR$^T$, —SR$^T$, —NO$_2$, —CN, —CF$_3$, R$^T$S(O)—, R$^T$S(O)$_2$—, $(R^T)_2$C=N—, R$^T$C(O)O—, R$^T$OC(O)—, R$^T$C(O)N(R$^T$)—, $(R^T)_2$NC(O)—, halogen, or —H, wherein each R$^T$ is $(C_1-C_{30})$hydrocarbyl or —H.

In various embodiments of formula (I), R$^1$ is a radical having formula (IV), and R$^{52}$ and R$^{58}$ of formula (IV) are independently $(C_1-C_{12})$alkyl or $(C_1-C_{20})$aryl. In one or more embodiments, R$^1$ is a radical having formula (IV), and R$^{53}$ and R$^{58}$ of formula (IV) are independently $(C_1-C_{12})$alkyl or $(C_1-C_{20})$aryl. In some embodiments, R$^1$ is a radical having formula (IV), and R$^{53}$ and R$^{57}$ of formula (IV) are independently $(C_1-C_{12})$alkyl or $(C_1-C_{20})$aryl. In some embodiments, R$^1$ is a radical having formula (IV), and R$^{53}$, R$^{55}$, and R$^{57}$ of formula (IV) are independently $(C_1-C_{12})$alkyl or $(C_1-C_{20})$aryl.

Any embodiment in which R$^{31}$-R$^{35}$, R$^{41}$-R$^{48}$, and R$^{51}$-R$^{59}$ is $(C_1-C_{12})$alkyl, $(C_1-C_{12})$alkyl may be methyl, ethyl, propyl, 2-propyl, n-butyl, tert-butyl, 2-methylpropyl, pentyl, 2,2-dimethylpropyl, hexyl, heptyl, octyl, n-octyl, tert-octyl, nonyl, decyl, undecyl, or dodecyl.

In one or more embodiments, subscript m of formula (I) is 2 and the metal-ligand complex has a structure according to formula (II):

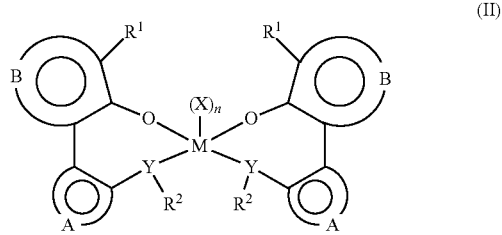

In formula (II), R$^1$, R$^2$, M, A, B, Y, and X are as defined in formula (I); and n is 1 or 2. All compounds according to formula (II) are also compounds according to formula (I). Thus, except where stated otherwise, it should be understood that a general reference herein to metal-ligand complexes having formula (I) includes, but is not necessarily limited to, all metal-ligand complexes having formula (II).

In some embodiments, in formula (II), M is zirconium or hafnium; each X is independently chosen from $(C_6-C_{50})$aryl, $(C_6-C_{50})$heteroaryl, $(C_4-C_{12})$diene, or halogen. Each Y is oxygen; each R$^1$ and R$^2$ is independently chosen from $(C_1-C_{50})$hydrocarbyl, $(C_1-C_{50})$heterohydrocarbyl, $(C_6-C_{50})$aryl, $(C_4-C_{50})$heteroaryl, halogen, and hydrogen.

In one or more embodiments, each B is -z$_6$-z$_7$-, and one of z$_6$ and z$_7$ is sulfur and the other is —C(H)—. In some embodiments, each R$^1$ is carbazolyl and each R$^2$ is methyl.

In one or more embodiments, each $R^1$ is independently 3,6-di-tert-butylcarbazol-9-yl or 2,7-di-tert-butylcarbazol-9-yl. In some embodiments, each $R^1$ is 3,5-di-tert-butylphenyl. In various embodiments, each $R^1$ is 2,4,6-trimethylphenyl.

In some embodiments, each B of formula (II) is —C($R^7$)C($R^8$)C($R^9$)—, where $R^7$, $R^8$, and $R^9$ are —H. In other embodiments, each B of formula (II), each B is —C($R^7$)C($R^8$)C($R^9$)—, where $R^7$ and $R^9$ are —H, and $R^8$ is ($C_1$-$C_{20}$)alkyl.

In one or more embodiments, metal-ligand complex of formula (I) has a structure according to formula (Ia), (Ib), or (Ic):

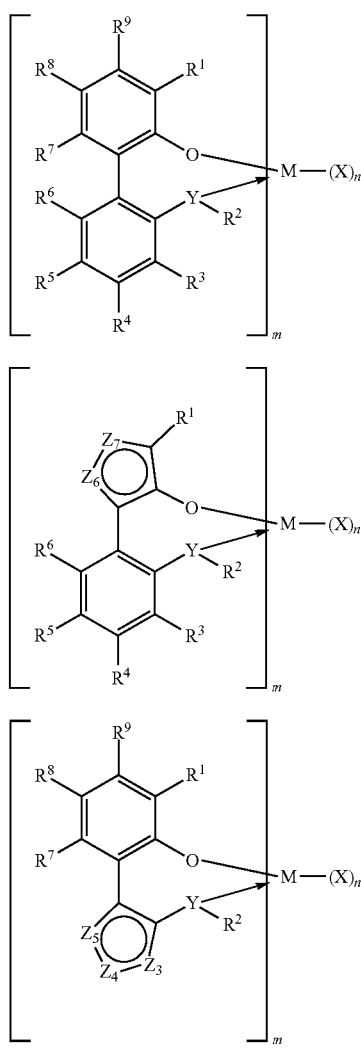

In formula (Ia), formula (Ib), and formula (Ic), R', $R^2$, $R^3$, $R^4$, $R^5$, $R^6$, $R^7$, $R^8$, $R^9$, $z_3$, $z_4$, $z_5$, $z_6$, $z_7$, n, M, Y, and X are as defined in formula (I). All compounds according to formulas (Ia), (Ib), and (Ic) are also compounds according to formula (I). Thus, except where stated otherwise, it should be understood that a general reference herein to metal-ligand complexes having formula (I) encompasses all metal-ligand complexes having formulas (Ia), (Ib), and (Ic).

In some embodiments, in formula (Ia) or formula (Ib), $R^5$ is ($C_1$-$C_{12}$)alkyl, ($C_6$-$C_{20}$)aryl, or halogen. In some embodiments, $R^5$ is fluorine.

In one or more embodiments, in formula (Ia) or (Ic), $R^8$ is ($C_1$-$C_{20}$)alkyl. In some embodiments, $R^8$ is methyl, ethyl, 1-propyl, 2-propyl, n-butyl, tert-butyl, 2-methylpropyl (isobutyl), n-butyl, n-hexyl, cyclohexyl, n-octyl, or tert-octyl, nonyl, decyl, undecyl, or dodecyl.

In the metal-ligand complex according to formula (I) or formula (II), each X bonds with M through a covalent bond, a dative bond, or an ionic bond. In some embodiments, each X is identical. The metal-ligand complex has 6 or fewer metal-ligand bonds and can be overall charge-neutral or may have a positive-charge associated with the metal center. In some embodiments, the catalyst system includes a metal-ligand complex according to formula (I), in which M is zirconium or hafnium; each X is independently chosen from ($C_1$-$C_{20}$)alkyl, ($C_1$-$C_{20}$)heteroalkyl, ($C_6$-$C_{20}$)aryl, ($C_4$-$C_{20}$)heteroaryl, ($C_4$-$C_{12}$)diene, or a halogen. In one or more embodiments, each X is independently benzyl, phenyl, or chloro.

In some embodiments, the monodentate ligand may be a monoanionic ligand. Monoanionic ligands have a net formal oxidation state of −1. Each monoanionic ligand may independently be hydride, ($C_1$-$C_{40}$)hydrocarbyl carbanion, ($C_1$-$C_{40}$)heterohydrocarbyl carbanion, halide, nitrate, carbonate, phosphate, sulfate, HC(O)O$^-$, HC(O)N(H)$^-$, ($C_1$-$C_{40}$)hydrocarbylC(O)O$^-$, ($C_1$-$C_{40}$)hydrocarbylC(O)N(($C_1$-$C_{20}$)hydrocarbyl)$^-$, ($C_1$-$C_{40}$)hydrocarbylC(O)N(H)$^-$, $R^K R^L B^-$, $R^K R^L N^-$, $R^K O^-$, $R^K S^-$, $R^K R^L P^-$, or $R^M R^K R^L Si^-$, where each $R^K$, $R^L$, and $R^M$ independently is hydrogen, ($C_1$-$C_{40}$)hydrocarbyl, or ($C_1$-$C_{40}$)heterohydrocarbyl, or $R^K$ and $R^L$ are taken together to form a ($C_2$-$C_{40}$)hydrocarbylene or ($C_1$-$C_{20}$)heterohydrocarbylene and $R^M$ is as defined above.

In other embodiments, at least one monodentate ligand X, independently from any other ligands X, may be a neutral ligand. In specific embodiments, the neutral ligand is a neutral Lewis base group such as $R^Q NR^K R^L$, $R^K OR^L$, $R^K SR^L$, or $R^Q PR^K R^L$, where each $R^Q$ independently is hydrogen, [($C_1$-$C_{10}$)hydrocarbyl]$_3$Si($C_1$-$C_{10}$)hydrocarbyl, ($C_1$-$C_{40}$)hydrocarbyl, [($C_1$-$C_{10}$)hydrocarbyl]$_3$Si, or ($C_1$-$C_{40}$)heterohydrocarbyl and each $R^K$ and $R^L$ independently is as previously defined.

Additionally, each X can be a monodentate ligand that, independently from any other ligands X, is a halogen, unsubstituted ($C_1$-$C_{20}$)hydrocarbyl, unsubstituted ($C_1$-$C_{20}$)hydrocarbylC(O)O—, or $R^K R^L N$—, wherein each of $R^K$ and $R^L$ independently is an unsubstituted ($C_1$-$C_{20}$)hydrocarbyl. In some embodiments, each monodentate ligand X is a chlorine atom, ($C_1$-$C_{10}$)hydrocarbyl (e.g., ($C_1$-$C_6$)alkyl or benzyl), unsubstituted ($C_1$-$C_{10}$)hydrocarbylC(O)O—, or $R^K R^L N$—, wherein each of $R^K$ and $R^L$ independently is an unsubstituted ($C_1$-$C_{10}$)hydrocarbyl. In one or more embodiments of formula (I) and (II), X is benzyl, chloro, —CH$_2$SiMe$_3$, or phenyl.

In further embodiments, each X is selected from methyl; ethyl; 1-propyl; 2-propyl; 1-butyl; 2,2-dimethylpropyl; trimethylsilylmethyl; phenyl; benzyl; chloro; bromo; or iodo. In some embodiments, each X is the same. In other embodiments, at least two X are different from each other. In the embodiments in which at least two X are different from at least one X, X is a different one of methyl; ethyl; 1-propyl; 2-propyl; 1-butyl; 2,2,-dimethylpropyl; trimethylsilylmethyl; phenyl; benzyl; and chloro. In further embodiments, the bidentate ligand is 2,2-dimethyl-2-silapropane-1,3-diyl or 1,3-butadiene.

In some embodiments, any or all of the chemical groups (e.g., X and $R^1$-$R^4$) of the metal-ligand complex of formula (I) may be unsubstituted. In other embodiments, none, any, or all of the chemical groups X and $R^1$-$R^4$ of the metal-ligand complex of formula (I) may be substituted with one or more than one $R^S$. When two or more than two $R^S$ are bonded to a same chemical group of the metal-ligand complex of formula (I), the individual $R^S$ of the chemical group may be bonded to the same carbon atom or heteroatom or to different carbon atoms or heteroatoms. In some embodiments, none, any, or all of the chemical groups X and $R^1$-$R^4$ may be persubstituted with $R^S$. In the chemical groups that are persubstituted with $R^S$, the individual $R^S$ may all be the same or may be independently chosen.

In illustrative embodiments, the catalyst systems may include a metal-ligand complex according to any of formulas (I) or (II) having the structure of any of Procatalysts 1-11:

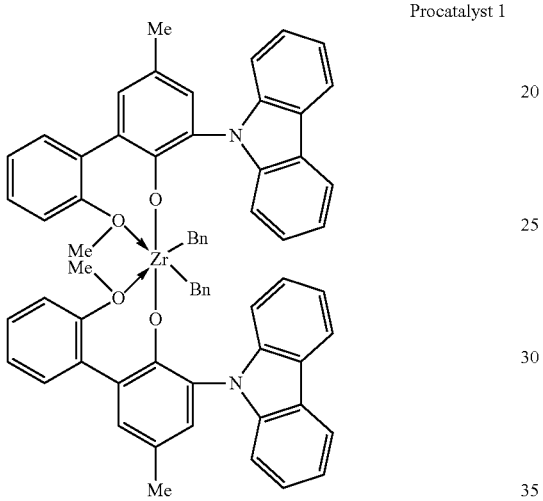

Procatalyst 1

Procatalyst 2

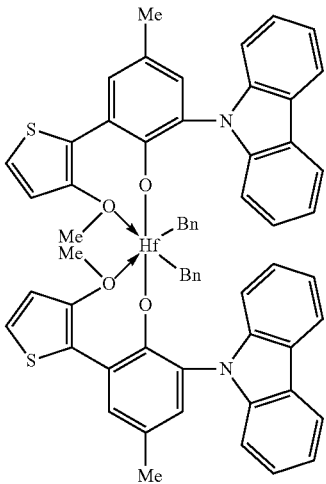

Procatalyst 3

Procatalyst 4

Procatalyst 5
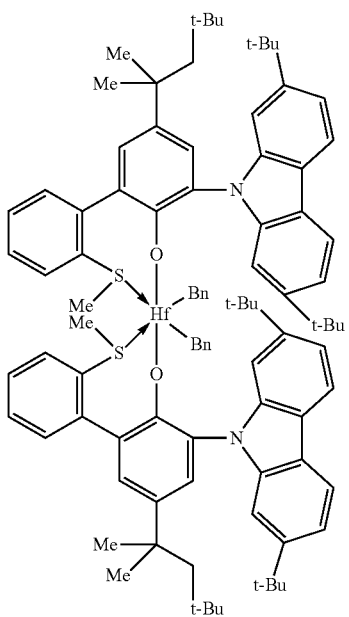
Procatalyst 7
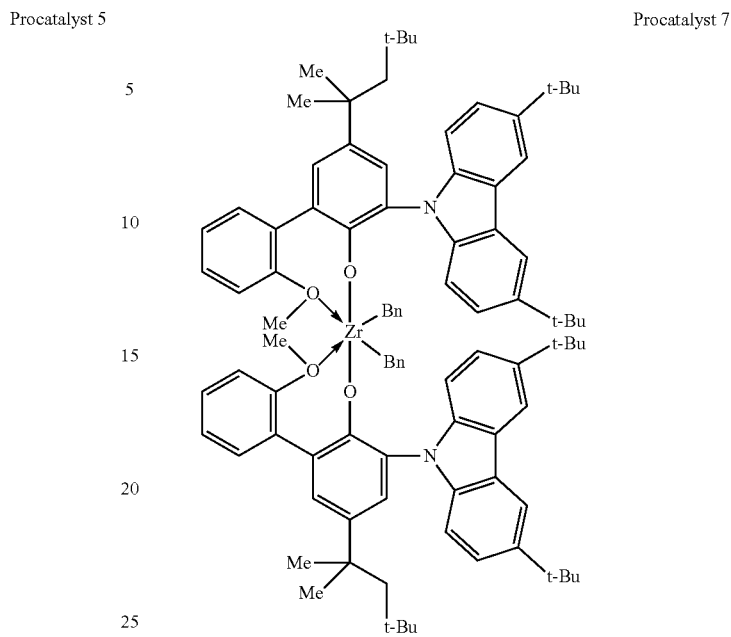
Procatalyst 6
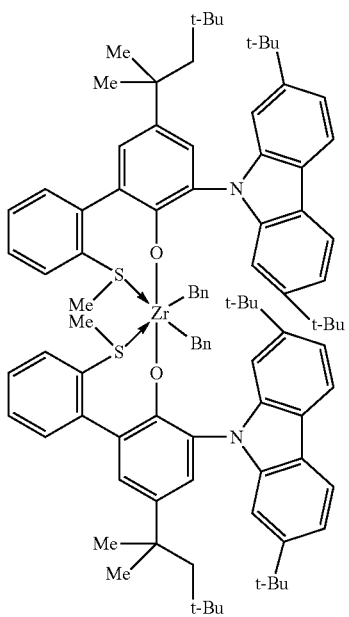
Procatalyst 8
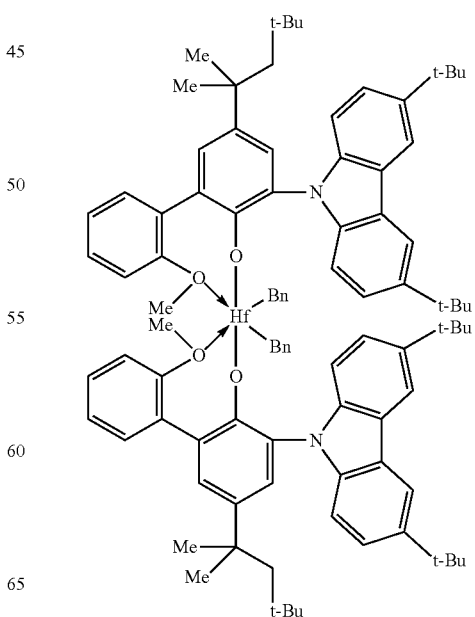

Procatalyst 9
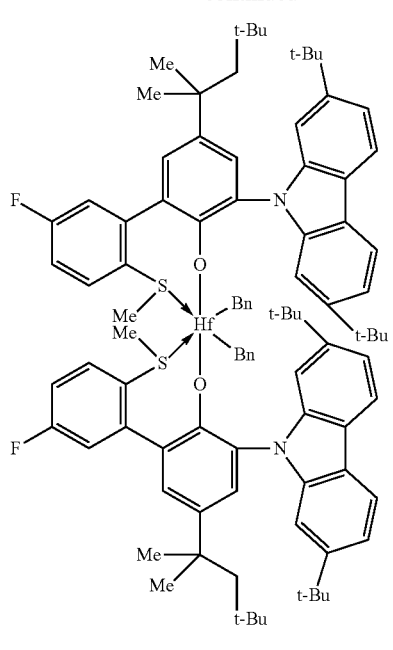
Procatalyst 10
Procatalyst 11
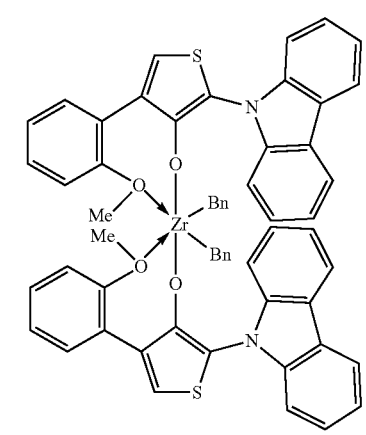
In illustrative embodiments, the Procatalysts 1 to 11 may be produced from Ligands 1 to 7:
Ligand 1
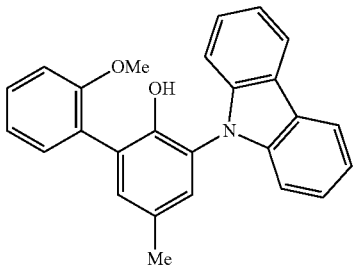
Ligand 2
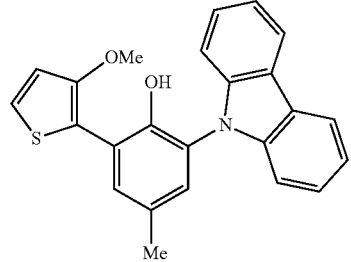
Ligand 3
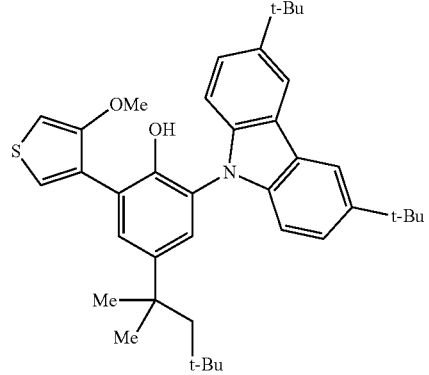
Ligand 4
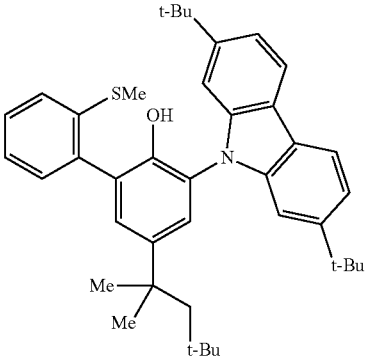

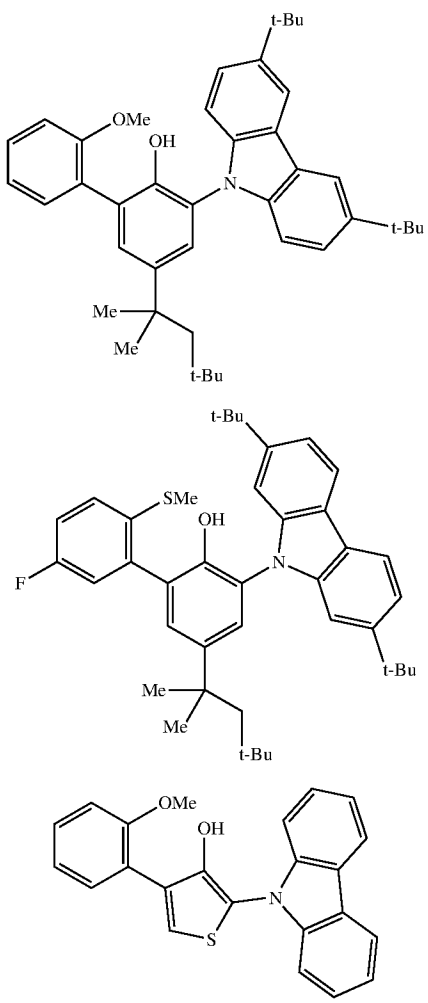

Ligand 5

Ligand 6

Ligand 7

Chain Shuttling and/or Chain Transfer Agent

In one or more embodiments, the polymerization processes of this disclosure include contacting ethylene and/or one or more ($C_3$-$C_{12}$)α-olefins in a reactor in the presence of a catalyst system and a chain transfer agent or chain shuttling agent. In such embodiments, the polymerization process includes three components: (A) a procatalyst comprising a metal-ligand complex having a structure of formula (I) and, optionally, a cocatalyst; (B) an olefin polymerization catalyst having a comonomer selectivity different from that of the procatalyst (A); and (C) the chain transfer agent or chain shuttling agent.

As additions to a catalyst system, chain transfer agents and chain shuttling agents are compounds capable of transferring polymer chains between two catalyst molecules in a single polymerization reactor. The catalyst molecules may have the same structure or different structures. When the catalyst molecules have different structures, they may have different monomer selectivites. Whether the compounds function as chain transfer agents or as chain shuttling agents depends on the type of polymerization reactor, even though the three components (A)-(C) previously described may be chemically identical in either type of polymerization reactor. For example, in a batch reactor with a single-catalyst system or a dual-catalyst system, the compounds function as chain transfer agents. In a continuous reactor with a dual-catalyst system, the compounds function as chain shuttling agents. In general, compounds that function as chain transfer agents in a batch reactor also can function as chain shuttling agents in a continuous reactor; conversely, molecules that function as chain shuttling agents also can function as chain transfer agents. Therefore, in embodiments of polymerization processes in this disclosure, it should be understood that disclosure of a compound as a "chain transfer agent" further constitutes disclosure of the same compounds as a "chain shuttling agent." Thus, the terms "chain transfer agent" and "chain shuttling agent" are interchangeable with respect to chemical compounds but are distinguishable when a process is specified to occur within a particular kind of polymerization reactor.

A catalyst's chain transfer ability is initially evaluated by running a campaign in which the level of chain transfer or shuttling agent (CSA) is varied to observe the depression in molecular weight and overall effect on the PDI expected for a shuttling catalyst. The molecular weight of the polymer generated by catalysts with potential to be good chain shuttlers will be more sensitive to the addition of CSA than the polymer molecular weight generated by catalysts exhibiting poorer shuttling or slower chain transfers kinetics. The Mayo equation (Equation 1) describes how a chain transfer agent decreases the number average chain length ($\overline{X_n}$) from the native number average chain length ($\overline{X_{n0}}$) where no chain transfer agent is present. Equation 2 defines a chain transfer or chain shuttling constant, Ca, as the ratio of chain transfer and propagation rate constants. By assuming that the vast majority of chain propagation occurs through ethylene insertion and not comonomer incorporation, Equation 3 describes the expected Mn of a polymerization. $Mn_0$ is the native molecular weight of the catalyst in the absence of chain shuttling agent and Mn is the molecular weight that is observed with chain shuttling agent ($Mn = Mn_0$ with no chain shuttling agent).

$$\frac{1}{\overline{X_n}} = \frac{1}{\overline{X_{n0}}} + \frac{k_{tr}[\text{chain transfer agent}]}{k_p[\text{monomer}]} \qquad \text{Equation 1}$$

$$Ca = \frac{k_{tr}}{k_p} \qquad \text{Equation 2}$$

$$\frac{1}{Mn} = \frac{1}{Mn_0} + Ca \frac{[\text{CSA}]}{[\text{monomer}] \times 28} \qquad \text{Equation 3}$$

$$[\text{Monomer}] = \qquad \text{Equation 4}$$
$$(\text{Mol \% } C2) \times [\text{ethylene}] + (\text{Mol \% } C8) \times [\text{octene}]$$

Typically, chain transfer agents comprise a metal that is Al, B, or Ga being in a formal oxidation state of +3; or a metal that is Zn or Mg being in a formal oxidation state of +2. Chain transfer agents suitable for processes of this disclosure are described in U.S. Patent Application Publication Number US 2007/0167315, which is incorporated herein by reference in its entirety.

In one or more embodiments of the polymerization process, the chain transfer agent may be chosen from diethylzinc, di(iso-butyl)zinc, di(n-hexyl)zinc, di(n-octyl)zinc, trimethylaluminum, triethylaluminum, trioctylaluminum, triethylgallium, iso-butylaluminum bis(dimethyl(t-butyl)siloxane), iso-butylaluminum bis(di(trimethylsilyl)amide), n-octylaluminum di(pyridine-2-methoxide), bis(n-octadecyl) iso-butylaluminum, iso-butylaluminum bis(di(n-pentyl) amide), n-octylaluminum bis(2,6-di-t-butylphenoxide, n-octylaluminum di(ethyl(1-naphthyl) amide), ethylaluminum bis(t-butyldimethylsiloxide), ethylaluminum di(bis(t-rimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis (dimethyl(t-butyl)siloxide), ethylzinc (2,6-diphenylphenoxide), ethylzinc (t-butoxide), dimethylmagnesium, dibutylmagnesium, and n-butyl-sec-butylmagnesium.

In some embodiments, the chain transfer agent is dialkyl zinc or trialkyl aluminum. In various embodiments, the chain transfer agent is diethyl zinc, trimethylaluminum, triethyl aluminum, or trioctyl aluminum.

Cocatalyst Component

The catalyst system comprising a metal-ligand complex of formula (I) may be rendered catalytically active by any technique known in the art for activating metal-based catalysts of olefin polymerization reactions. For example, the procatalyst according to a metal-ligand complex of formula (I) may be rendered catalytically active by contacting the complex to an activating co-catalyst or combining the complex with an activating co-catalyst. Additionally, the metal-ligand complex according for formula (I) includes both a neutral procatalyst form, and a positively-charged catalytic form, which may be positively charged due to the loss of a monoanionic ligand, such as a benzyl or phenyl. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activating co-catalysts include Group 13 metal compounds containing $(C_1$-$C_{20})$hydrocarbyl substituents as described herein. In some embodiments, Group 13 metal compounds are tri$((C_1$-$C_{20})$hydrocarbyl)-substituted-aluminum or tri$((C_1$-$C_{20})$hydrocarbyl)-boron compounds. In other embodiments, Group 13 metal compounds are tri(hydrocarbyl)-substituted-aluminum, tri$((C_1$-$C_{20})$hydrocarbyl)-boron compounds, tri$((C_1$-$C_{10})$alky)aluminum, tri$((C_6$-$C_{18})$aryl) boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris$((C_1$-$C_{20})$hydrocarbyl borate (e.g. trityl tetrafluoroborate) or a tri$((C_1$-$C_{20})$hydrocarbyl) ammonium tetra$((C_1$-$C_{20})$hydrocarbyl)borane (e.g. bis(octadecyl)methylammonium tetrakis(pentafluorophenyl)borane). As used herein, the term "ammonium" means a nitrogen cation that is a $((C_1$-$C_{20})$hydrocarbyl$)_4$N$^+$ a $((C_1$-$C_{20})$hydrocarbyl$)_3$N(H)$^+$, a $((C_1$-$C_{20})$hydrocarbyl$)_2$N(H)$_2^+$, $(C_1$-$C_{20})$hydrocarbylN(H)$_3^+$, or N(H)$_4^+$, wherein each $(C_1$-$C_{20})$hydrocarbyl, when two or more are present, may be the same or different.

Combinations of neutral Lewis acid activating co-catalysts include mixtures comprising a combination of a tri $((C_1$-$C_4)$alkyl)aluminum and a halogenated tri$((C_6$-$C_{18})$aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system that includes the metal-ligand complex of formula (I) may be activated to form an active catalyst composition by combination with one or more cocatalysts, for example, a cation forming cocatalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to modified methyl aluminoxane (MMAO), bis(hydrogenated tallow alkyl)methyl, tetrakis(pentafluorophenyl)borate(1-) amine, and combinations thereof.

In some embodiments, more than one of the foregoing activating co-catalysts may be used in combination with each other. A specific example of a co-catalyst combination is a mixture of a tri$((C_1$-$C_4)$hydrocarbyl)aluminum, tri$((C_1$-$C_4)$hydrocarbyl)borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Polyolefins

The catalytic systems according to embodiments are utilized in the polymerization of olefins, primarily ethylene and propylene. In some embodiments, there is only a single type of olefin or α-olefin in the polymerization scheme, creating a homopolymer. However, additional α-olefins may be incorporated into the polymerization procedure. The additional α-olefin co-monomers typically have no more than 20 carbon atoms. For example, the α-olefin co-monomers may have 3 to 10 carbon atoms or 3 to 8 carbon atoms. Exemplary α-olefin co-monomers include, but are not limited to, propylene, 1-butene, 1-pentene, 1-hexene, 1-heptene, 1-octene, 1-nonene, 1-decene, and 4-methyl-1-pentene. For example, the one or more α-olefin co-monomers may be selected from the group consisting of propylene, 1-butene, 1-hexene, and 1-octene; or in the alternative, from the group consisting of 1-hexene and 1-octene.

The ethylene based polymers, for example homopolymers and/or interpolymers (including copolymers) of ethylene and optionally one or more co-monomers such as α-olefins, may comprise from at least 50 percent by weight monomer units derived from ethylene. All individual values and subranges encompassed by "from at least 50 weight percent" are disclosed herein as separate embodiments; for example, the ethylene based polymers, homopolymers and/or interpolymers (including copolymers) of ethylene and optionally one or more co-monomers such as α-olefins may comprise at least 60 weight percent monomer units derived from ethylene; at least 70 weight percent monomer units derived from ethylene; at least 80 weight percent monomer units derived from ethylene; or from 50 to 100 weight percent monomer units derived from ethylene; or from 80 to 100 weight percent units derived from ethylene.

In some embodiments, the ethylene based polymers may comprise at least 90 mole percent units derived from ethylene. All individual values and subranges from at least 90 mole percent are included herein and disclosed herein as separate embodiments. For example, the ethylene based polymers may comprise at least 93 mole percent units derived from ethylene; at least 96 mole percent units; at least 97 mole percent units derived from ethylene; or in the alternative, from 90 to 100 mole percent units derived from ethylene; from 90 to 99.5 mole percent units derived from ethylene; or from 97 to 99.5 mole percent units derived from ethylene.

In some embodiments of the ethylene based polymer, the amount of additional α-olefin is less than 50%; other embodiments include at least 1 mole percent (mol %) to 25 mol %; and in further embodiments the amount of additional α-olefin includes at least 5 mol % to 100 mol %. In some embodiments, the additional α-olefin is 1-octene.

The ethylene based polymers may further comprise one or more additives. Such additives include, but are not limited to, antistatic agents, color enhancers, dyes, lubricants, pigments, primary antioxidants, secondary antioxidants, processing aids, UV stabilizers, and combinations thereof. The ethylene based polymers may contain any amounts of additives. The ethylene based polymers may compromise from about 0 to about 10 percent by the combined weight of such additives, based on the weight of the ethylene based polymers and the one or more additives. The ethylene based polymers may further comprise fillers, which may include, but are not limited to, organic or inorganic fillers. The ethylene based polymers may contain from about 0 to about 20 weight percent fillers such as, for example, calcium carbonate, talc, or $Mg(OH)_2$, based on the combined weight of the ethylene based polymers and all additives or fillers. The ethylene based polymers may further be blended with one or more polymers to form a blend.

Polymerization Conditions

In one or more embodiments, the polymerization processes include, but are not limited to, solution polymerization process, particle forming polymerization process, and combinations thereof using one or more conventional reactors e.g. loop reactors, isothermal reactors, fluidized bed reactors, stirred tank reactors, batch reactors in parallel, series, and/or any combinations thereof.

In one embodiment, the ethylene based polymer may be produced via solution polymerization in a dual reactor system, for example a dual loop reactor system, wherein ethylene and optionally one or more α-olefins are polymerized in the presence of the catalyst system, as described herein, and optionally one or more co-catalysts. In another embodiment, the ethylene based polymer may be produced via solution polymerization in a dual reactor system, for example a dual loop reactor system, wherein ethylene and optionally one or more α-olefins are polymerized in the presence of the catalyst system in this disclosure, and as described herein, and optionally one or more other catalysts. The catalyst system, as described herein, can be used in the first reactor, or second reactor, optionally in combination with one or more other catalysts. In one embodiment, the ethylene based polymer may be produced via solution polymerization in a dual reactor system, for example a dual loop reactor system, wherein ethylene and optionally one or more α-olefins are polymerized in the presence of the catalyst system, as described herein, in both reactors.

In another embodiment, the ethylene based polymer may be produced via solution polymerization in a single reactor system, for example a single loop reactor system, in which ethylene and optionally one or more α-olefins are polymerized in the presence of the catalyst system, as described within this disclosure, and optionally one or more cocatalysts, as described in the preceding paragraphs.

In general, the solution phase polymerization process occurs in one or more well-stirred reactors such as one or more loop reactors or one or more spherical isothermal reactors at a temperature in the range of from 30 to 300° C.; for example, from 120 to 215° C., and at pressures in the range of from 300 to 1500 psi; for example, from 400 to 750 psi. The residence time in solution phase polymerization process is typically in the range of from 2 to 30 minutes; for example, from 10 to 20 minutes. Ethylene, one or more solvents, one or more Group III metal/Lanthanide based catalyst systems, and optionally one or more comonomers are fed continuously to the one or more reactors, in the absence of any activator. Exemplary solvents include, but are not limited to, isoparaffins. For example, such solvents are commercially available under the name ISOPAR E from ExxonMobil Chemical Co., Houston, Texas The resultant mixture of the ethylene based polymer and solvent is then removed from the reactor and the ethylene based polymer is isolated. Solvent is typically recovered via a solvent recovery unit, i.e. heat exchangers and vapor liquid separator drum, and is then recycled back into the polymerization system.

In some embodiments, a polymerization process for producing an ethylene-based polymer may include polymerizing ethylene and at least one additional α-olefin in the presence of a catalyst system, wherein the catalyst system incorporates at least one metal-ligand complex of formula (I), (II), or (III). The polymer resulting from such a catalyst system that incorporates the metal-ligand complex of formula (I), (II), or (III) may have a density according to ASTM D792 (incorporated herein by reference in its entirety) from 0.850 $g/cm^3$ to 0.950 $g/cm^3$, from 0.880 $g/cm^3$ to 0.920 $g/cm^3$, from 0.880 $g/cm^3$ to 0.910 $g/cm^3$, or from 0.880 $g/cm^3$ to 0.900 $g/cm^3$, for example.

In another embodiment, the polymer resulting from the polymerization process that includes the metal-ligand complex of any of formulas (I) or (II) has a melt flow ratio $(I_{10}/I_2)$ from 5 to 15, in which melt index I2 is measured according to ASTM D1238 (incorporated herein by reference in its entirety) at 190° C. and 2.16 kg load, and melt index Iio is measured according to ASTM D1238 at 190° C. and 10 kg load. In other embodiments the melt flow ratio (1042) is from 5 to 10, and in others, the melt flow ratio is from 5 to 9.

In some embodiments, the polymer resulting from the polymerization process that includes the metal-ligand complex of any of formulas (I) or (II) has a molecular-weight distribution (MWD) from 1 to 25, where MWD is defined as $M_w/M_n$ with $M_w$ being a weight-average molecular weight and $M_n$ being a number-average molecular weight. In other embodiments, the polymers resulting from the catalyst system have a MWD from 1 to 6. Another embodiment includes a MWD from 1 to 3; and other embodiments include MWD from 1.5 to 2.5.

Embodiments of the catalyst systems described in this disclosure yield unique polymer properties as a result of the high molecular weights of the polymers formed and the amount of the co-monomers incorporated into the polymers.

All solvents and reagents are obtained from commercial sources and used as received unless otherwise noted. Anhydrous toluene, hexanes, tetrahydrofuran, and diethyl ether are purified via passage through activated alumina and, in some cases, Q-5 reactant. Solvents used for experiments performed in a nitrogen-filled glovebox are further dried by storage over activated 4 Å molecular sieves. Glassware for moisture-sensitive reactions is dried in an oven overnight prior to use. NMR spectra are recorded on Varian 400-MR and VNMRS-500 spectrometers. LC-MS analyses are performed using a Waters e2695 Separations Module coupled with a Waters 2424 ELS detector, a Waters 2998 PDA detector, and a Waters 3100 ESI mass detector. LC-MS separations are performed on an XBridge C18 3.5 μm 2.1×50 mm column using a 5:95 to 100:0 acetonitrile to water gradient with 0.1% formic acid as the ionizing agent. HRMS analyses are performed using an Agilent 1290 Infinity LC with a Zorbax Eclipse Plus C18 1.8 μm 2.1×50 mm column coupled with an Agilent 6230 TOF Mass Spectrometer with electrospray ionization. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from internal tetramethylsilane (TMS, δ scale) using residual protons in the deuterated solvent as references. $^{13}$C NMR data are determined with $^1$H decoupling, and the chemical shifts are reported downfield from tetramethylsilane (TMS, δ scale) in ppm versus the using residual carbons in the deuterated solvent as references.

General Procedure for PPR Screening Experiments

Polyolefin catalysis screening is performed in a high throughput parallel polymerization reactor (PPR) system. The PPR system is composed of an array of 48 single-cell (6×8 matrix) reactors in an inert-atmosphere glovebox. Each cell is equipped with a glass insert with an internal working liquid volume of approximately 5 mL. Each cell has independent controls for pressure, and the liquid in the cell is continuously stirred at 800 rpm. Catalyst solutions, unless otherwise noted, are prepared by dissolving an appropriate amount of a procatalyst in toluene. All liquids (for example, solvent, 1-octene, chain shuttling agent solutions as appropriate to the experiment, and catalyst solutions) are added to the single-cell reactors via robotic syringes. Gaseous reagents (i.e. ethylene, $H_2$) are added to the single-cell reactors via a gas injection port. Prior to each run, the reactors are heated to 80° C., purged with ethylene, and vented.

A portion of Isopar-E is added to the reactors. The reactors are heated to the run temperature and pressured to the appropriate psig with ethylene. Toluene solutions of reagents are added in the following order: (1) 1-octene with 500 nmol of scavenger MMAO-3A; (2) activator (cocatalyst-1, cocatalyst-2, etc); and (3) catalyst.

Each liquid addition is chased with a small amount of Isopar-E so that after the final addition, a total reaction volume of 5 mL is reached. Upon addition of the catalyst, the PPR software begins monitoring the pressure of each cell. The pressure (within approximately 2-6 psig) is maintained by the supplemental addition of ethylene gas by opening the valve at the set point minus 1 psi and closing it when the pressure reached 2 psi higher. All drops in pressure are cumulatively recorded as "Uptake" or "Conversion" of the ethylene for the duration of the run or until the uptake or conversion requested value is reached, whichever occurs first. Each reaction is quenched with the addition of 10% carbon monoxide in argon for 4 minutes at 40-50 psi higher than the reactor pressure. A shorter "Quench Time" means that the catalyst is more active. In order to prevent the formation of too much polymer in any given cell, the reaction is quenched upon reaching a predetermined uptake level (50 psig for 120° C. runs, 75 psig for 150° C. runs). After all the reactions are quenched, the reactors are allowed to cool to 70° C. The reactors are vented, purged for 5 minutes with nitrogen to remove carbon monoxide, and the tubes are removed. The polymer samples are dried in a centrifugal evaporator at 70° C. for 12 hours, weighed to determine polymer yield, and submitted for IR (1-octene incorporation) and GPC (molecular weight) analysis.

SymRAD HT-GPC Analysis

The molecular weight data is determined by analysis on a hybrid Symyx/Dow built Robot-Assisted Dilution High-Temperature Gel Permeation Chromatographer (Sym-RAD-GPC). The polymer samples are dissolved by heating for 120 minutes at 160° C. in 1,2,4-trichlorobenzene (TCB) at a concentration of 10 mg/mL stabilized by 300 parts per million (ppm) of butylated hydroxyl toluene (BHT). Each sample was diluted to 1 mg/mL immediately before the injection of a 250 μL aliquot of the sample. The GPC is equipped with two Polymer Labs PLgel 10 μm MIXED-B columns (300×10 mm) at a flow rate of 2.0 mL/minute at 160° C. Sample detection is performed using a PolyChar IR4 detector in concentration mode. A conventional calibration of narrow polystyrene (PS) standards is utilized with apparent units adjusted to homo-polyethylene (PE) using known Mark-Houwink coefficients for PS and PE in TCB at this temperature.

1-Octene Incorporation IR Analysis

The running of samples for the HT-GPC analysis precedes the IR analysis. For the IR analysis, a 48-well HT silicon wafer is utilized for deposition and analysis of 1-octene incorporation of samples. For the analysis, the samples are heated to 160° C. for less than or equal to 210 minutes; the samples are reheated to remove magnetic GPC stir bars and are shaken with glass-rod stir bars on a J-KEM Scientific heated robotic shaker. Samples are deposited while being heated using a Tecan MiniPrep 75 deposition station, and the 1,2,4-trichlorobenzene is evaporated off the deposited wells of the wafer at 160° C. under nitrogen purge. The analysis of 1-octene is performed on the HT silicon wafer using a NEXUS 670 E.S.P. FT-IR.

Batch Reactor Polymerization Procedure

The batch reactor polymerization reactions are conducted in a 2 L Parr™ batch reactor. The reactor is heated by an electrical heating mantle, and is cooled by an internal serpentine cooling coil containing cooling water. Both the reactor and the heating/cooling system are controlled and monitored by a Camile™ TG process computer. The bottom of the reactor is fitted with a dump valve that empties the reactor contents into a stainless steel dump pot. The dump pot is prefilled with a catalyst kill solution (typically 5 mL of an Irgafos/Irganox/toluene mixture). The dump pot is vented to a 30 gallon blow-down tank, with both the pot and the tank purged with nitrogen. All solvents used for polymerization or catalyst makeup are run through solvent purification columns to remove any impurities that may affect polymerization. The 1-octene and IsoparE are passed through two columns, the first containing A2 alumina, the second containing Q5. The ethylene is passed through two columns, the first containing A204 alumina and 4 Å molecular sieves, the second containing Q5 reactant. The $N_2$, used for transfers, is passed through a single column containing A204 alumina, 4 Å molecular sieves and Q5.

The reactor is loaded first from the shot tank that may contain IsoparE solvent and/or 1-octene, depending on reactor load. The shot tank is filled to the load set points by use of a lab scale to which the shot tank is mounted. After liquid feed addition, the reactor is heated up to the polymerization temperature set point. If ethylene is used, it is added to the reactor when the ethylene is at the reaction temperature to maintain reaction pressure set point. The amount of ethylene added is monitored by a micro-motion flow meter. For some experiments, the standard conditions at 120° C. are 46 g ethylene and 303 g 1-octene in 611 g of IsoparE, and the standard conditions at 150° C. are 43 g ethylene and 303 g 1-octene in 547 g of IsoparE.

The procatalyst and activators are mixed with the appropriate amount of purified toluene to achieve a molarity solution. The procatalyst and activators are handled in an inert glove box, drawn into a syringe and pressure transferred into the catalyst shot tank. The syringe is rinsed three times with 5 mL of toluene. Immediately after the catalyst is added, the run timer begins. If ethylene is used, it is added by the Camile to maintain reaction pressure set point in the reactor. The polymerization reactions are run for 10 minutes, then the agitator is stopped, and the bottom dump valve is opened to empty reactor contents to the dump pot. The contents of the dump pot are poured into trays and placed in a lab hood where the solvent was evaporated off overnight. The trays containing the remaining polymer are transferred to a vacuum oven, where they are heated up to 140° C. under vacuum to remove any remaining solvent. After the trays cool to ambient temperature, the polymers were weighed for yield to measure efficiencies, and submitted for polymer testing.

EXAMPLES

Procatalysts 1 to 11 were synthesized from Ligands 1 to 7. Examples 1 to 2 are include the results from polymerization reactions in the batch reactor and the parallel pressure reactor. One or more features of the present disclosure are illustrated in view of the examples as follows:

The Ligands 1 to 7 and Procatalysts 1 to 11 were synthesized using protocols found in patent application publications WO 2013/052585 A2, WO 2013/036546 A2, and WO 2013/013111.

Example 1: Polymers Yielded from Procatalysts

Catalyst efficiency (grams polymer yielded per gram of metal) and resulting polymer characteristics were assessed for Procatalysts 1 to 11. The polymerization reactions were carried out in a 2-L semi-batch reactor initially without diethyl zinc (DEZ), and then with three different loading of DEZ added (0, 50 µmol, and 200 µmol. The activator was [HNMe(C$_{18}$H$_{37}$)$_2$][B(C$_6$F$_5$)$_4$] in amounts of 1.5 molar equivalents relative to the amount of procatalyst.

The procatalysts in Table 1 produced polymers at temperatures up to 190° C. The bidentate procatalysts, Procatalysts 1, 6, and 10, were the most active compared to the others at greater than or equal to 150° C.

TABLE 1

Polymerization Data from Semi-Batch Reactor Experiments

| Procatalyst No. | Temp. (° C.) | Efficiency (g poly/ g Metal) | Mw (g/mol) | PDI (Mw/Mn) | Mol % Octene | $T_M$ (° C.) |
|---|---|---|---|---|---|---|
| 1 | 150 | 252,127 | 116,557 | 3.0 | 5.9 | 85.0 |
| 2 | 150 | 5,883 | 372,026 | 2.6 | 7.7 | 69.0 |
| 3 | 150 | 39,218 | 100,631 | 2.6 | 11.4 | 44.9 |
| 4 | 150 | 31,748 | 131,142 | 2.5 | 8.9 | 67.6 |
| 5 | 150 | 232,506 | 67,637 | 2.3 | 0.6 | 128.4 |
| 6 | 150 | 4,209,419 | 14,940 | 2.5 | 1.4 | 127.2 |
| 7 | 150 | 14,616 | 107,347 | 2.9 | 18.6 | 88.8 |
| 8 | 150 | 700 | 374,211 | 15.7 | 21.5 | 93.8 |
| 9 | 120 | 53,224 | 62,420 | 2.2 | 0.6 | 128.7 |
| 9 | 150 | 171,438 | 50,611 | 2.2 | 1.0 | 127.1 |
| 10 | 120 | 890,117 | 11,258 | 2.2 | 0.4 | 127.8 |
| 10 | 150 | 1,172,937 | 10,600 | 2.4 | 0.5 | 126.0 |
| 10 | 190 | 712,532 | 12,127 | 2.8 | 0.5 | 125.6 |
| 11 | 120 | 120,582 | 67,934 | 2.2 | 5.9 | 95.7 |
| 11 | 150 | 86,600 | 43,934 | 2.3 | 6.5 | 92.2 |

*Standard Semi-batch reactor conditions: 120° C.—46 g ethylene and 303 g 1-octene in 611 g of IsoparE, 150° C.—43 g ethylene and 303 g 1-octene in 547 g of IsoparE, and 190° C.—46 g ethylene and 292 g of 1-octene in 515 g of IsoparE.
**Mol % Octene or C8/olefin is defined as: (moles 1-octene/(total moles 1-octene and ethylene)) × 100.

The procatalysts produced ethylene/octene copolymers with a molecular weight ranging from 14,940 to 374,211 g/mol. Procatalysts 2 and 8 produced polymers with the highest molecular weights, 372,026 g/mol and 374,211 g/mol, respectively. Procatalysts 3, 7, and 8 produced polymers with the highest comonomer incorporation, specifically 11.4, 18.6, 21.5, respectively. Procatalyst 1 to 7 and 9 to 11 produced polymers with narrow polydispersities (less than or equal to 3.0).

Example 2—Chain Transfer Studies

To determine the chain transfer rates for procatalysts 1 to 11, a semi-batch campaign was conducted using varying amounts of the chain transfer agent, $Et_2Zn$ (0, 50 µmol, and 200 µmol). All reactions were conducted at 150° C. and employed 1.2 equivalents of [HNMe(C$_{18}$H$_{37}$)$_2$][B(C$_6$F$_5$)$_4$] as the activator relative to the procatalyst. The semi-batch campaign was conducted at 150° C. with 12.1 g of ethylene under a pressure of 136 psi, 57 g of 1-octene, and 555 g of IsoparE. The catalyst efficiency and the Mw, PDI and comonomer incorporation of the corresponding produced polymers is presented in Table 2. The $M_n$ for each run was calculated using Equation 3 with the values of Ca and $M_{n0}$ fit using the Microsoft Excel Solver to minimize the squared deviations between the fitted and experimental molecular weight data for all the runs with a particular catalyst.

TABLE 2

Polymerization Data from Semi-Batch Reactor Experiments w/ $Et_2Zn$ (DEZ)

| Procatalyst No. | Temp. (° C.) | DEZ (µmol) | Efficiency (g poly/ g Metal) | Mw (g/mol) | PDI (Mw/Mn) | Mol % Octene |
|---|---|---|---|---|---|---|
| 1 | 150 | 0 | 95,004 | 126,033 | 2.8 | 4.8 |
| 1 | 150 | 50 | 92,081 | 79,191 | 2.8 | 4.6 |
| 1 | 150 | 200 | 98,658 | 39,300 | 2.6 | 4.8 |
| 2 | 150 | 0 | 2,615 | 266,099 | 2.5 | 5.5 |
| 2 | 150 | 50 | 1,681 | 59,686 | 2.4 | 5.8 |
| 2 | 150 | 200 | 1,793 | 15,767 | 2.3 | 5.4 |
| 3 | 150 | 0 | 11,205 | 115,961 | 2.3 | 5.2 |
| 3 | 150 | 50 | 8,964 | 52,817 | 2.4 | 5.5 |
| 3 | 150 | 200 | 8,964 | 21,101 | 2.4 | 5.1 |

TABLE 2-continued

Polymerization Data from Semi-Batch Reactor Experiments w/ Et$_2$Zn (DEZ)

| Procatalyst No. | Temp. (° C.) | DEZ (µmol) | Efficiency (g poly/ g Metal) | Mw (g/mol) | PDI (Mw/Mn) | Mol % Octene |
|---|---|---|---|---|---|---|
| 4 | 150 | 0 | 14,567 | 112,805 | 2.4 | 6.8 |
| 4 | 150 | 50 | 14,940 | 68,969 | 2.3 | 5.9 |
| 4 | 150 | 200 | 15,207 | 29,647 | 2.3 | 6.6 |
| 5 | 150 | 0 | 67,231 | 64,312 | 2.2 | 0.6 |
| 5 | 150 | 50 | 106,449 | 53,662 | 2.1 | 0.4 |
| 5 | 150 | 200 | 134,461 | 38,812 | 2.1 | 0.4 |
| 6 | 150 | 0 | 1,205,823 | 14,253 | 2.4 | 1.0 |
| 6 | 150 | 50 | 957,350 | 14,155 | 2.4 | 1.0 |
| 6 | 150 | 200 | 1,337,367 | 13,271 | 2.2 | 0.9 |
| 7 | 150 | 0 | 20,886 | 145,856 | 3.4 | 11.0 |
| 7 | 150 | 50 | 2,923 | 178,056 | 2.1 | 10.9 |
| 7 | 150 | 200 | 246,646 | 185,497 | 6.5 | 10.9 |
| 9 | 120 | 0 | 23,307 | 65,303 | 2.2 | 1.0 |
| 9 | 120 | 50 | 21,165 | 58,442 | 2.1 | 0.3 |
| 9 | 120 | 200 | 23,448 | 47,177 | 2.1 | 0.1 |
| 10 | 150 | 0 | 317,899 | 10,673 | 2.2 | 0.5 |
| 10 | 150 | 50 | 322,597 | 10,499 | 2.3 | 0.5 |
| 10 | 150 | 200 | 323,000 | 10,019 | 2.2 | 0.5 |
| 11 | 150 | 0 | 10,962 | 57,901 | 2.3 | 5.7 |
| 11 | 150 | 50 | 5,755 | 29,071 | 2.3 | 5.5 |
| 11 | 150 | 200 | 1,409 | 9,801 | 2.5 | 4.6 |

*Standard Semi-batch reactor conditions using Et$_2$Zn as CSA: 150° C.—12 g ethylene and 59 g 1-octene in 531 g of IsoparE.
**Mol % Octene or C8/olefin is defined as: (moles 1-octene/(total moles 1-octene and ethylene)) × 100.

TABLE 3

Polymerization Data from Semi-Batch Reactor Experiments w/Et$_2$Zn (DEZ)

| Procatalyst No. | Temperature. (° C.) | Chain Transfer Constant ($C_a$) |
|---|---|---|
| 1 | 150 | 1.3 |
| 2 | 150 | 3.6 |
| 3 | 150 | 2.8 |
| 4 | 150 | 1.4 |
| 5 | 150 | 0.55 |
| 6 | 150 | 0.0 |
| 7 | 150 | 0.0 |
| 9 | 120 | 0.31 |
| 10 | 150 | 0.32 |
| 11 | 150 | 5.2 |

The high chain transfer constants for the procatalysts 1-5 and 11 (Ca≥0.5) at 150° C., indicates that these catalysts have a high sensitivity to chain transfer agents and rapidly undergo chain transfer with these agents. The narrow PDI either did not change or decreased as observed for each procatalyst as the amount of Et$_2$Zn is increased is evidence that these procatalysts potentially undergo reversible chain transfer with a CSA as opposed to irreversible chain transfer.

The invention claimed is:

1. A process of polymerizing olefins, the process comprising contacting ethylene, a (C$_3$-C$_{40}$) alpha-olefin comonomer, and a solvent in the presence of a chain transfer agent and a catalyst system, wherein the chain transfer agent comprises dialkyl zinc, and wherein the catalyst system comprises a metal-ligand complex according to formula (Ia) or formula (Ic):

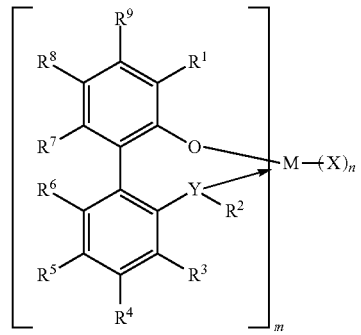

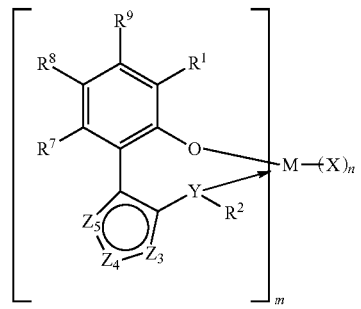

where
M is a metal chosen from titanium, zirconium, or hafnium, the metal having a formal oxidation state of +2, +3, or +4;
each X is a monodentate or bidentate ligand independently chosen from unsaturated (C$_2$-C$_{50}$) hydrocarbon, unsaturated (C$_2$-C$_{50}$)heterohydrocarbon, (C$_1$-C$_{50}$)hydrocarbyl, (C$_6$-C$_{50}$)aryl, (C$_6$-C$_{50}$)heteroaryl, cyclopentadienyl, substituted cyclopentadienyl, (C$_4$-C$_{12}$)diene, halogen, —N(R$^N$)$_2$, and —NCOR$^C$;
n is 1 or 2;
m is 2;
the metal-ligand complex has 6 or fewer metal-ligand bonds;
each Y is oxygen;
each R$^1$ is independently selected from carbazolyl or substituted carbazolyl;
each R$^2$ is independently chosen from (C$_1$-C$_{10}$)alkyl;
z$_3$, z$_4$, and z$_5$ are selected from the group consisting of sulfur, oxygen, —N(R$^A$)—, and —C(R$^A$)—, provided that exactly one of z$_3$, z$_4$, or z$_5$ is —C(R$^A$)— or that exactly two of z$_3$, z$_4$, or z$_5$ are —C(R$^A$)—;
R$^3$, R$^4$, R$^5$, and R$^6$ are independently chosen from (C$_1$-C$_{50}$)hydrocarbyl, (C$_1$-C$_{50}$)heterohydrocarbyl, halogen, or —H;
R$^7$, R$^8$, and R$^9$ are independently chosen from (C$_1$-C$_{50}$) hydrocarbyl, (C$_1$-C$_{50}$)heterohydrocarbyl, (C$_6$-C$_{50}$) aryl, (C$_4$-C$_{50}$)heteroaryl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N (R)—, (R$^C$)$_2$NC(O)—, halogen, or —H, wherein in formula (Ia), R$^8$ is methyl;
each R$^A$ is independently chosen from (C$_1$-C$_{50}$)hydrocarbyl, (C$_1$-C$_{50}$)heterohydrocarbyl, (C$_6$-C$_{50}$)aryl, (C$_4$-C$_{50}$)heteroaryl, —Si(R$^C$)$_3$, —Ge(R$^C$)$_3$, —P(R$^P$)$_2$, —N(R$^N$)$_2$, —OR$^C$, —SR$^C$, —NO$_2$, —CN, —CF$_3$, R$^C$S(O)—, R$^C$S(O)$_2$—, (R$^C$)$_2$C=N—, R$^C$C(O)O—, R$^C$OC(O)—, R$^C$C(O)N (R)—, (R$^C$)$_2$NC(O)—, halogen, or —H, wherein any two R$^A$ groups bonded to neighboring atoms are optionally linked; and each R$^C$, R$^N$, and R$^P$ is independently a (C$_1$-C$_{50}$) hydrocarbyl.

2. The polymerization process according to claim 1, wherein:

M is zirconium or hafnium; and each X is independently chosen from (C$_6$-C$_{20}$)aryl, (C$_4$-C$_{20}$)heteroaryl, (C$_4$-C$_{12}$) diene, or a halogen.

3. The polymerization process according to claim 1, wherein the metal-ligand complex has a structure according to formula (Ia), and wherein R$^3$, R$^4$, R$^5$ and R$^6$ are —C(H)—.

4. The polymerization process according to claim 1, wherein each R$^2$ is methyl.

5. The polymerization process according to claim 1, wherein in formula (Ic), R$^7$ and R$^9$ are —C(H)— and R$^8$ is (C$_1$-C$_{20}$)alkyl.

6. The polymerization process according to claim 1, wherein each R$^1$ is carbazolyl.

7. The polymerization process according to claim 1, wherein each R$^1$ is independently 3,6-di-tert-butylcarbazol-9-yl or 2,7-di-tert-butylcarbazol-9-yl.

8. The polymerization process of claim 1, wherein the chain transfer agent is diethyl zinc.

9. The polymerization process according to claim 1, wherein the polymerization process occurs in a reactor.

10. The polymerization process according to claim 1, wherein the polymerization process occurs at a reaction temperature from 120° C. to 190° C.

11. The polymerization process according to claim 1, wherein the catalyst system further comprises a co-catalyst.

12. The polymerization process according to claim 1, wherein each X is independently benzyl, phenyl, or chloro.

13. The polymerization process according to claim 1, wherein the metal-ligand complex has a structure according to formula (Ia).

14. The polymerization process according to claim 1, wherein the metal-ligand complex has a structure according to formula (Ic).

15. The polymerization process according to claim 1, wherein the metal-ligand complex is one of the following structures:

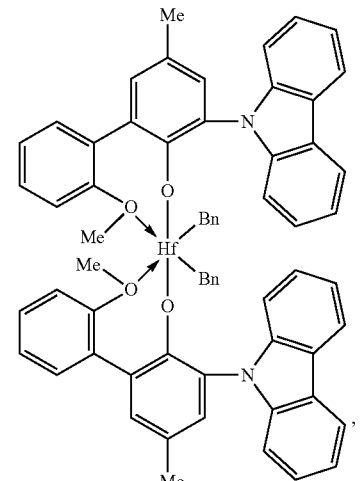

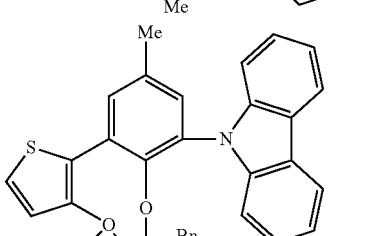

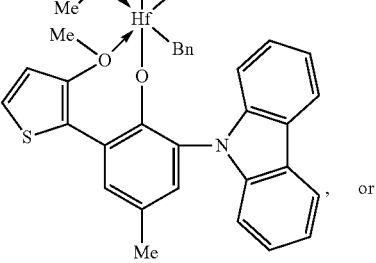

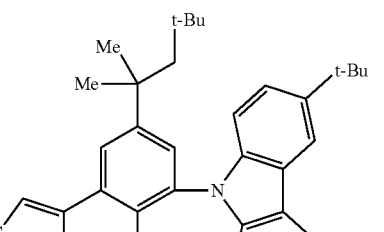

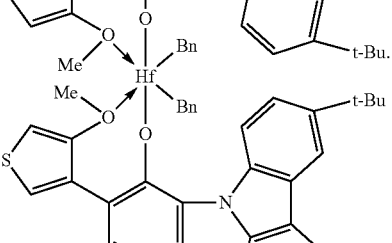

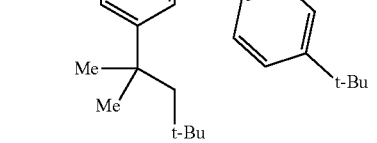

* * * * *